United States Patent [19]

Kamp

[11] Patent Number: 4,491,738
[45] Date of Patent: Jan. 1, 1985

[54] MEANS FOR GENERATING ELECTRICITY DURING DRILLING OF A BOREHOLE

[75] Inventor: Anthony-Willem Kamp, Rijswijk, Netherlands

[73] Assignee: Shell Internationale Research Maatschappij, B.V., The Hague, Netherlands

[21] Appl. No.: 443,287

[22] Filed: Nov. 22, 1982

[30] Foreign Application Priority Data

Nov. 24, 1981 [GB] United Kingdom ................. 8135346

[51] Int. Cl.³ .................. E21C 7/06; G08C 23/00; H02K 33/00; E21B 47/12
[52] U.S. Cl. .......................... 290/43; 290/42; 290/53; 290/54; 367/83; 310/17; 175/40; 73/151
[58] Field of Search .................. 290/43, 42, 54, 53; 73/151; 175/40, 48, 104; 310/17, 27, 339; 367/83, 85

[56] References Cited

U.S. PATENT DOCUMENTS

| 3,036,645 | 5/1962 | Rowley | 175/104 X |
| 3,421,700 | 1/1969 | Seamans, Jr. | 310/17 X |
| 3,448,305 | 6/1969 | Raynal et al. | 310/7 |
| 3,693,428 | 9/1972 | Le Peuvedic et al. | 73/151 |
| 3,970,877 | 7/1966 | Russell et al. | 175/40 X |
| 4,078,620 | 3/1978 | Westlake et al. | 367/83 X |

FOREIGN PATENT DOCUMENTS

2009473 6/1979 United Kingdom ................. 175/40
2096208 10/1982 United Kingdom .

*Primary Examiner*—John Gonzales
*Assistant Examiner*—Terry Flower
*Attorney, Agent, or Firm*—Pravel, Gambrell, Hewitt & Kimball

[57] ABSTRACT

A generator for providing electric energy in a borehole during drilling thereof, the generator comprising an anchor which is movable in a reciprocating mode in response to pressure pulses in the drilling fluid caused by rapidly opening or closing a valve.

6 Claims, 8 Drawing Figures

MEANS FOR GENERATING ELECTRICITY DURING DRILLING OF A BOREHOLE

The invention relates to drilling of a borehole in the earth's crust for exploration and production of natural resources such as oil or natural gas, and in particular to a means located in the drill string and adapted for generating electric energy during such drilling operations.

In the search for hydrocarbons, there is a tendency to drill deeper wells and to drill in more hostile environments than in the past. These adverse drilling circumstances result in rising drilling costs, and these rising costs emphasize the need for optimizing the drilling process. Such optimization of the drilling process can be reached by applying systems that enable close monitoring of parameters relevant for the drilling process. In the specification these systems are referred to as "telemetry systems".

These telemetry systems consist of surface components, such as a receiver and a processing unit, and subsurface components, such as sensors, signal adaptors and a processor, a transmission system and an energy pack. The subsurface components are incorporated in a pipe section which is located in the lower end of a drill string.

The sensors measure the parameters that are relevant for the drilling process, such as the azimuth and the inclination of the borehole, the direction of the tool face in the borehole, the weight on the bit and torque, and the gamma radiation, the electric resistivity and the porosity of the formations traversed. Signal processors transform the output of the sensors into coded signals, which signals are transmitted to surface by the transmitter. At surface, the signals are received and decoded, in order to store and to display the magnitudes of the measured parameters in a proper format.

Finally, the energy pack, located in the pipe section, supplies the energy that is required to operate the sensors, the signal processor and the transmission system. Most telemetry systems are powered by electric energy, and the energy pack applied in the majority of these systems to supply the electric energy consists of an electric generator and an electric accumulator.

There are three types of electric generators known in the art that are used as a subsurface component of a telemetry system:
(1) a rotary generator driven by a drilling fluid powered hydraulic turbine,
(2) a linear generator included in a shock absorber, and
(3) a generator consisting of a small disc with a piezo-electric crystal or a fixed coil with a magnetic core movable relatively to the coil, wherein the disc or the core are activated by the turbulence in the flow of drilling fluid.

When applying a hydraulic turbine for actuating the rotary generator, the turbine and the generator are normally located in a common housing together with the other subsurface components, wherein the housing is mounted in a pipe section that can be included in the drill string. Details of telemetry systems equipped with a rotary generator can be found in UK patent application No. 2,009,473 and U.S. Pat. No. 3,693,428. These generators and their drives are expensive, as their construction is complex and includes many seals and bearings.

An alternative to the expensive rotary generator is the linear generator which is included in a shock absorber together with the other subsurface components. The linear generator has a simple construction, however creating room for the other subsurface components results in a decreasing bending stiffness of the shock absorber. Therefore the shock absorber containing a telemetry system is a weak section in the drill string. Furthermore, a shock absorber is not considered necessary in most drilling operations. Details of the linear generator included in a shock absorber can be found in U.S. Pat. No. 3,448,305.

The third generator consists of a vibratory flexible element forming a part of the outer surface of a pipe section that will be included in the drill string. The flexible element consists of piezo-electric material or of a fixed coil with a magnetic core movably with respect to the coil.

The element is activated by the turbulence in the drilling fluid that flows in the annular space between the drill string and the borehole wall. The amount of electric energy generated with such a generator is likely to be small relative to the electric energy requirements of the sensors, the signal processors and the transmission system. Details of this electric generator can be found in U.S. Pat. 3,970,877.

Object of the invention is a means for generating electric energy in a borehole operating in a simple manner, which electric generator has a minimum of seals and bearings and occupies a small volume such that the electric generator can be incorporated in the pipe section that houses the sensors, the signal processor, the transmission system and the electric accumulator.

Another object of the invention is a means for generating electric energy in a borehole operating in a simple manner, having a minimum of seals and bearings, which electric generator can be combined with the transmission system into one compact system.

In order to achieve these objects the means according to the invention is characterized in that for inserting the housing in a drill string, a conduit system for passing fluid through the housing, a valve means located in the conduit system, and an electric generator including a stator and anchor assembly, wherein the stator is mounted immovably in the housing and the anchor is mounted such that it can move in a reciprocating mode relative to the stator by the action of changes in the fluid flow through the conduit system caused by the operation of the valve means.

It will be appreciated that the electric generator according to the invention can be applied in all kinds of telemetry systems that require electric energy. Most of these telemetry systems use variations of the pressure in the column of drilling fluid in the borehole to transmit data to surface. These pressure variations, or pressure pulses, are induced by changes in the fluid flow through the pipe section generated by the transmission system. It will be appreciated that the combination of these so-called "pressure pulse transmitters" with the electric generator is attractive since the changes in the fluid flow that activate the anchor can be used to transmit the information.

There are two types of pressure pulse transmitters known in the art: the "positive pressure pulse transmitter", and the "negative pressure pulse transmitter". The positive pressure pulse transmitter includes a valve means that permits or restricts fluid flow through the pipe section, and a system of this kind has been described in detail in U.S. Pat. No. 3,693,428. The negative pressure pulse transmitter includes a valve means that permits or stops flow from the interior of the pipe section to the exterior thereof, and is described in detail in U.S. Pat. No. 4,078,620.

Different embodiments of the electric generator according to the invention will now be described by way of example with reference to the drawings, wherein.

Figure 1:
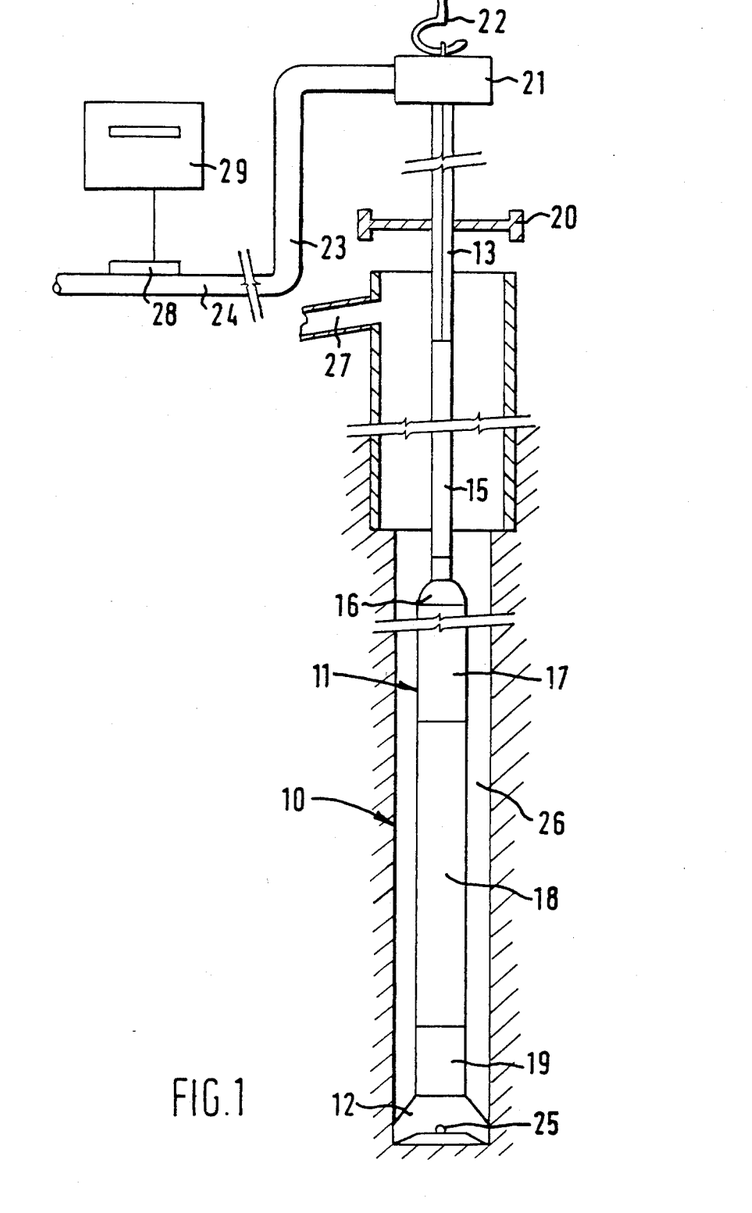
FIG. 1 shows a schematic side-view of a rotary drilling system including a pipe section housing the subsurface components of the telemetry system.

Reference is made to FIG. 1, showing a borehole 10 and in operative position in the borehole 10 a drill string 11 with a drill bit 12 attached to the lower end of the drill string 11. The drill string 11 consists of a kelly 13 having a polygonal cross-section, a string of interconnected drill pipes 15 connected to the lower end of the kelly 13, a cross-over section 16 to connect a plurality of interconnected drill collars 17 to the lower end of the string of drill pipes 15, a pipe section 18 housing the subsurface components of the telemetry system and a section 19 connecting the drill bit 12 to the lower end of the pipe section 18.

A rotary table 20 cooperates with the kelly 13 such that the kelly 13 can slide therethrough and that the rotation of the rotary table 20 can be transferred to the kelly 13.

The upper end of the kelly 13 is connected to a swivel 21, which in turn is attached to a hook 22. The hook 22 is part of a travelling block (not shown) of a block and tackle assembly (not shown) driven by the rig drawworks (not shown). The block and tackle assembly allows lowering and raising of the drill string 11 in a controlled way.

The swivel 21 permits rotation of the kelly 13 and forms a fluid communication for the passage of drilling fluid between a flexible mud hose 23 and the interior of the drill string 11.

One or more pumps (not shown) suck drilling fluid from the mud pits (not shown) and pump the drilling fluid via a stand pipe 24, the mud hose 23 and the swivel 21 down through the interior of the drill string 11. The drilling fluid returns to surface via a plurality of nozzles 25 in the drill bit 12. the annular space 26 between the drill string 11 and the wall of the borehole 10, and an outlet 27, which outlet is connected to the mud pits (not shown).

A pressure sensor 28 is located on the stand pipe 24 to monitor the pressure of the drilling fluid in the stand pipe 24. It will be explained hereinafter with reference to FIGS. 2A, 2B and 5 that transmission of data from the pipe section 18 to surface is done by varying the pressure in the drilling fluid. The pressure changes are detected by the sensor 28, and the output of the sensor 28 is interpreted by a signal processor 29 which displays the data in proper units, and transmits them to other locations for interpretation.

With exception of the subsurface components of the telemetry system in pipe section 18, all foregoing means described with reference to FIG. 1 are known in the art and will not be discussed in detail.

Figure 2A:
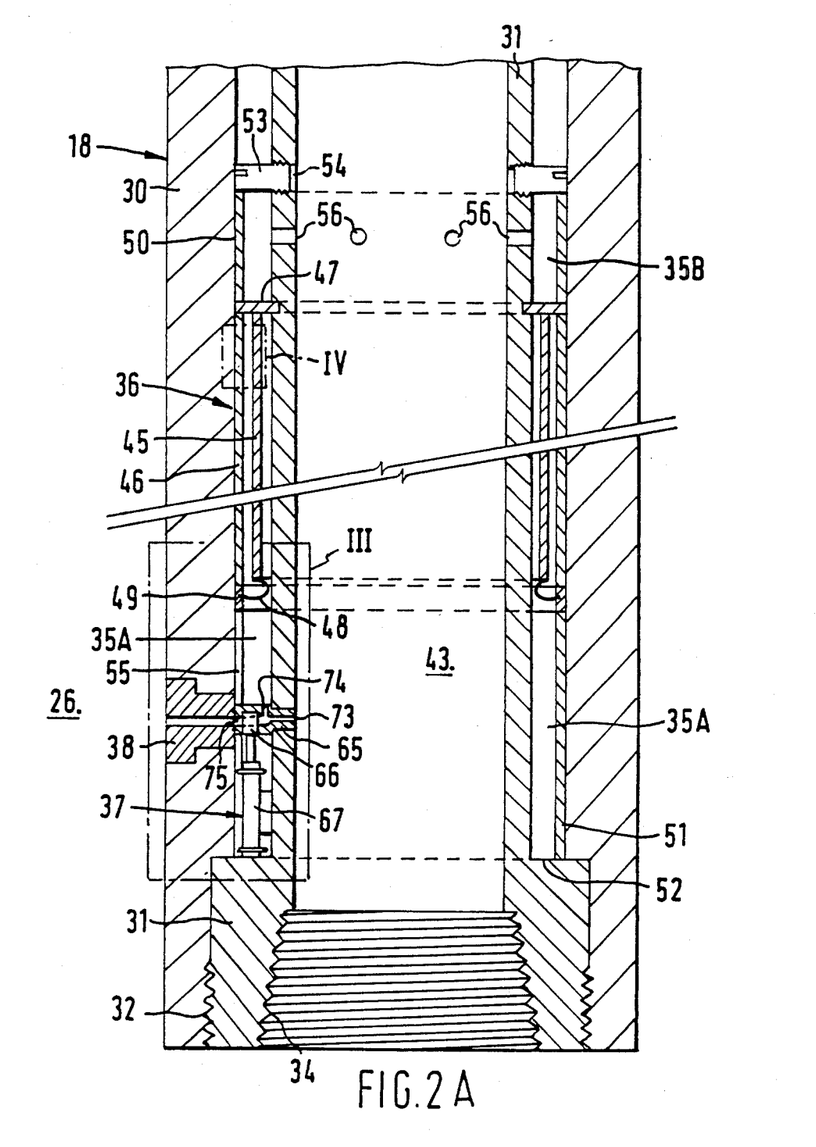
FIGS. 2A and 2B show schematically a longitudinal section of the lower part and the upper part, respectively, of a pipe section housing a telemetry system with a negative pressure pulse transmitter.
Figure 2B:
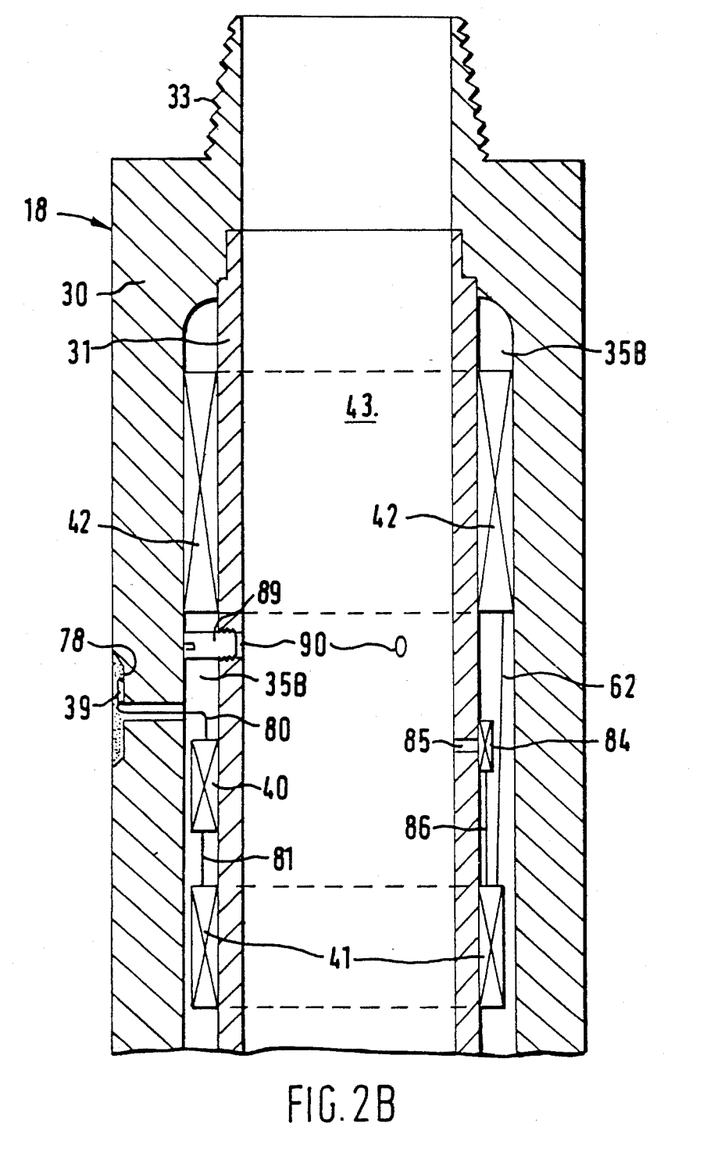

Reference is now made to FIGS. 2A and 2B which show schematically the lower part and the upper part, respectively, of a longitudinal section of the pipe section 18 housing a telemetry system with a negative pressure pulse transmitter.

The pipe section 18 consists of a housing 30 and a pipe 31 concentric therewith and secured to the lower end of the housing 30 by means of a screw coupling 32. The upper end of the housing 30 is equipped with upper connector means 33 (see FIG. 2B) in the shape of an external tapered screw thread, and the concentric pipe 31 is equipped with lower connector means 34 (see FIG. 2A) in the shape of an internal tapered screw thread. With these connector means the pipe section 18 is included in the drill string 11 (see FIG. 1).

The lower annular space 35A (see FIG. 2A) between the housing 30 and the pipe 31 houses a linear electric generator 36, and a valve 37 permitting or stopping flow through a nozzle 38. The outer surface of the upper end of the housing 30 houses a sensor 39 (see FIG. 2B). The upper annular space 35B houses a signal adaptor 40, a processor 41 and an electric accumulator 42.

The interior 43 of the pipe 31, the upper annular space 35B and the lower annular space 35A, are part of a conduit system.

The linear electric generator 36 consists of a sleeve-like anchor assembly 45, and a sleeve-like stator assembly 46. The upper end of the anchor 45 is suspended by suitable means from a flexible ring 47 made of an elastic material (such as rubber), and the lower end of the anchor 45 is supported by a number of spring elements 48. The spring elements 48 are connected with appropriate means to a ring 49. Movement of the stator 46 in axial direction relative to the housing 30 is prevented by an upper- and a lower spacer ring 50 and 51, respectively. The lower spacer ring 51 rests on a shoulder 52 of the pipe 31 and the upper spacer ring 50 is kept down by a plurality of pins 53 which are screwed in threaded holes 54 in the wall of the pipe 31. An opening 55 in the lower spacer ring 51 allows attachment of the valve 37 to the pipe 31. The way in which the valve 37 is attached to the pipe 31 is shown in more detail in FIG. 3.

A plurality of openings 56 in the wall of the pipe 31 allows fluid communication between the interior 43 of the pipe 31 and the upper annular space 35B.

Interconnected coils (that will be described in more detail hereinafter with reference to FIG. 4), made of insulated electric wires, form part of the stator 46. The coils are connected to a rectifier (not shown) in the processor 41 via electric wires (not shown). The wires (not shown) run through a groove (not shown) in the flexible ring 47 and a groove (not shown) in the upper spacer ring 50. The rectifier (not shown) is connected to the accumulator 42 via electric wires 62.

Figure 3:
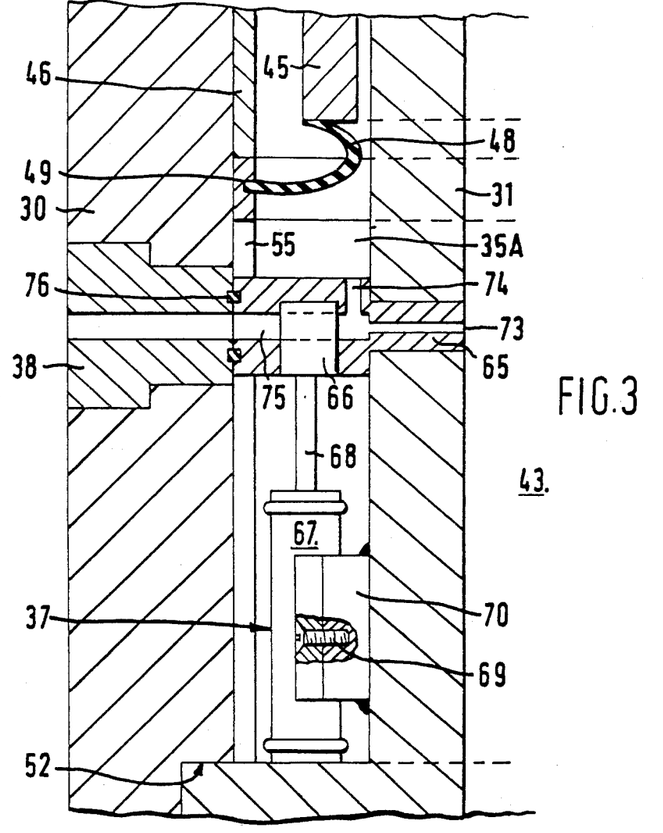
FIG. 3 shows detail III of FIG. 2A reproduced on a scale larger than the scale of FIG. 2A.

Reference is now made to FIG. 3, which shows detail III of FIG. 2A reproduced on a scale larger than the scale of FIG. 2A. The valve 37 consists of a valve housing 65, a cylindrical valve body 66 located in the housing 65 and an electric motor 67 operatively connected via a stem 68 to the valve body 66. The motor 67 rests on the shoulder 52 and is connected with screws 69 to a block 70 welded on the pipe 31. The signals to operate the electric motor 67 are conducted from the processor 41 (see FIG. 2B) to the electric motor 67 via electric wires (not shown). The wires (not shown) run through a groove (not shown) in the upper spacer ring 50 (see FIG. 2A), through a groove (not shown) in the flexible ring 47, through a groove (not shown) in the exterior wall of the pipe 31, and through the lower annular space 35A. The groove in the exterior wall of the pipe 31 is filled with a sealing material, such as rubber, to protect the electric wires.

The valve housing 65 (see FIG. 3) has two inlets 73 and 74 and an outlet 75. The inlet 73 is in fluid communication with the interior 43 of the pipe 31, and the inlet 74 is in communication with the lower annular space 35A. The outlet 75 is in fluid communication with the bore of the nozzle 38. The cylindrical valve body 66 is supported in the valve housing 65 by suitable means (not shown), allowing the rotation of the valve body 66 about the central axis of the stem 68. The electric motor 67 drives the valve body 66. Rotation of the valve body 66 over 90° from the position shown in FIG. 3 will stop fluid communication between the inlets 73 and 74 and the outlet 75. A seal 76 prevents leakage of fluid between the valve housing 65 and the nozzle 38. It will be appreciated that for the sake of ready understanding details about the seals in the valve housing 65 are omitted.

The inlets 73 and 74, the outlet 75, and the plurality of openings 56 (see FIG. 2A) complete the conduit system that includes the interior 43 of the pipe 31, the upper annular space 35B, the lower annular space 35A and the passages mentioned in the beginning of this sentence.

In order to describe the remaining part of the subsurface components of the telemetry system reference is now made to FIG. 2B. The sensor 39 is a strain gauge that measures the weight on bit. The strain gauge 39 is mounted in a groove 78 in the outer surface of the housing 30. For protection the groove 78 is filled with proper filling means, such as epoxy resin. The strain gauge 39 is connected to the signal adaptor 40 via electric wires 80. In its turn the signal adaptor 40 is connected to the processor 41 via electric wires 81.

To allow activation of the system by remote control, a pressure sensor 84 is applied, which is mounted on the outside of the pipe 31 and is in fluid communication with the interior 43 of the pipe 31 via opening 85. The sensor is electrically coupled to the processor 41 by electric wires 86. The processor is programmed to start a measuring/transmitting sequence upon receiving a predetermined signal from the pressure sensor 84. This sequence will be described hereinafter when the operation of the telemetry system will be described.

In order to guide the pipe 31 and to protect the subsurface components during assembly of the pipe 31 in the housing 30, a plurality of centralizer pins 89 is screwed in threaded holes 90 in the pipe 31.

Figure 4:
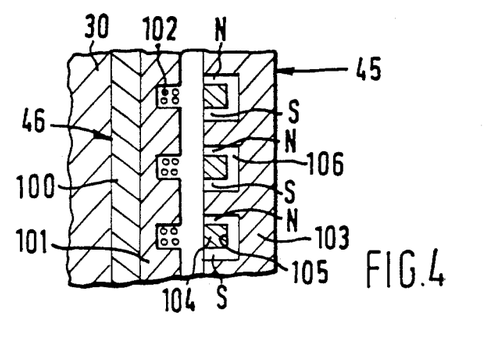
FIG. 4 shows detail IV of FIG. 2A reproduced on a scale larger than the scale of FIG. 2A.

The linear electric generator will now be described with reference to FIG. 4, showing detail IV of FIG. 2A reproduced on a scale larger than the scale of FIG. 2A. The stator 46 consists of a cylindrical body 100, a magnetizable metal face 101 and coils 102 of insulated electric wires. The anchor 45 consists of a grooved cylindrical body 103 and elements 104 of non-magnetic material located in the grooves 105 to separate each pair of the North and South pole faces of the magnets 106.

The processor 41, the electric accumulator 42, the signal adaptor 40 and the strain gauge 39 are known in the art and will therefore not be discussed in detail.

The operation of the telemetry system with the negative pressure pulse transmitter will now be described with reference to the FIGS. 1, 2A, 2B and 3.

Prior to lowering the drill string 11 (see FIG. 1) in the borehole 10, the electric accumulator 42 (see FIG. 2) is charged at surface, and the valve 37 is closed. The techniques used in rotary drilling to lower the drill string 11 to the bottom of the borehole 10 and to deepen the borehole are known, and will therefore not be described.

When a survey has to be made, the driller varies the pump pressure in a predetermined pattern. The pressure sensor 84 detects the pressure changes and the processor 41 recognizes this signal as a signal to start a measuring/transmitting sequence. This sequence consists of three steps, (1) the weight on bit is measured by the strain gauge and a signal representing the weight on bit is transmitted to surface; (2) at surface this signal is converted and the weight on bit displayed; and (3) finally the processor 41 deactivates the subsurface components until a new survey has to be made.

The steps will now be described in more detail. The magnitude of the weight on bit, as measured by the strain gauge 39, is converted into a binary code by the signal adaptor 40 and fed into the processor 41. The processor 41 converts the binary code in a sequence of commands to open and to close the valve 37 successively. This sequence of commands represents the magnitude of the weight on bit.

Opening the valve 37 results in a change in the fluid flow through the conduit system, which change comprises a fluid flow from the lower annular space 35A to the exterior of the housing 30 and a fluid flow from the interior 43 of the pipe 31 to the exterior of the housing 30, since the fluid pressure in the interior 43 of the pipe 31 exceeds the fluid pressure in the annular space 26 around the pipe section 18. The latter flow causes the fluid pressure in the interior 43 of the pipe 31 to drop. As the interior 43 of the pipe 31 is in fluid communication with the interior of the stand pipe 24 (see FIG. 1), this pressure drop is detected by the pressure sensor 28 at surface and stored in the signal processor 29.

When the sequence of commands has been carried out by the valve 37, the magnitude of the weight on bit has been transmitted to surface. The signal processor 29 (at surface) converts the received code and displays the measured value of the weight on bit in appropriate units, and transmits the value to other locations.

The subsurface processor 41 (see FIG. 2B) is programmed to deactivate the subsurface components when the survey has been performed, until a new survey has to be done.

The operation of the subsurface components requires electric energy, which is supplied by the electric accumulator 42. In order to recharge the accumulator during drilling, electric energy is generated with the linear electric generator 36.

The method of generating electric energy will now be explained with reference to FIGS. 2A, 2B and 4.

Opening valve 37, in order to transmit data to surface, results in a fluid flow from the lower annular space 35A (see FIG. 2A) to the exterior of the drill string, and since there is a difference in cross-section between the inlet 74 of the valve housing 65 and the inlet 73 thereof, the pressure in the lower annular space 35A will drop with respect to the pressure in the interior 43 of the pipe 31. As the interior 43 is in fluid communication with the upper annular space 35B, the fluid pressure in the upper annular space 35B equals the fluid pressure in the interior 43. Consequently opening of the valve 37 results in a pressure difference between the annular spaces 35A and 35B. This pressure difference between the upper annular space 35B and the lower annular space 35A forces the flexible ring 47 to deform, and as a result thereof the anchor 45 moves relative to the stator 46 against the action of the spring elements 48.

Closing the valve 37 results in a fluid flow from the interior 43 via the valve housing 65 to the lower annular space 35A, as a result whereof the pressure difference between the upper- and the lower annular spaces will be neutralized. The anchor 45 is returned to its upper position by the action of the spring elements 48. Each displacement of the anchor 45 relative to the stator 46 results in a change of the magnetic flux field through the coils 102, as a result whereof an amount of electric energy will be generated which is proportional to the cumulative volume of the magnetic material in the magnets 106 and the magnetic energy density of this magnetic material.

The electric energy is conducted via the electric wires (not shown) to a rectifier (not shown) in the processor 41, from where it is conducted in rectified form via electric wires 62 to the electric accumulator 42 where the electric energy is stored.

The expression "net output of the electric generator" as will be used hereinafter refers to the difference between the amount of electric energy generated with the linear electric generator and the amount of energy required to operate the valve. It will be appreciated that the construction of the generator and the construction of the valve are such that the net output of electric energy is positive. The expression "effective output of the electric generator" that will be used hereinafter is the difference between the net output of electric energy and the electric energy required to operate the sensor, the signal adaptor and the processor.

It will be appreciated that the electric accumulator will start to discharge when the effective output gets negative. In order to avoid discharging of the electric accumulator, the processor may be programmed to operate the valve during intervals in which no surveys are required. During these intervals the sensors and signal adaptors are switched off, but the processor activates the valve and the electric generator generates electric energy in the same way as described hereinabove.

In an alternative embodiment of the invention the anchor may be moved by the fluid flow in the lower annular space. This alternative embodiment will now be described with reference to FIG. 2A. In this alternative embodiment the inlet 73 is not present. Further, the flexible ring 47 is replaced by a guide ring, centralizing the anchor 45 and permitting fluid communication between the upper- and lower annular spaces 35B and 35A.

In the alternative embodiment, opening of the valve 37 will result in a pressure drop in the annular spaces 35A and 35B and consequently fluid will flow from the interior 43 of the pipe 31 through the openings 56, through the annular spaces 35B and 35A, the inlet 74 and the bore of the nozzle 38 to the exterior of the housing 30.

The fluid flow through the lower annular space 35A entrains the anchor 45 of the linear electric generator 36 against the action of the spring elements 48. Upon closing the valve 37, the fluid flow stops and the spring elements 48 force the anchor 45 to move back. The generated electric energy is, as described with reference to FIG. 2B, conducted to the electric accumulator and stored therein.

It will be appreciated that the relative movement between the anchor and the stator of the electric generator is not restricted to reciprocating displacements in axial direction as described with reference to FIGS. 2A and 2B. In an alternative manner, the anchor can be mounted to rotate relative to the stator in a reciprocating mode. Such generator, wherein the anchor rotates back and forward, is of the oscillating type and will be described hereinafter in more detail with reference to FIG. 5.

Besides using the electric generator in combination with the negative pressure pulse transmitter as described with reference to FIGS. 2A and 2B, it is also possible to use the electric generator in combination with a positive pressure pulse transmitter. This latter system will be described hereinafter also with reference to FIG. 5.

Figure 5:
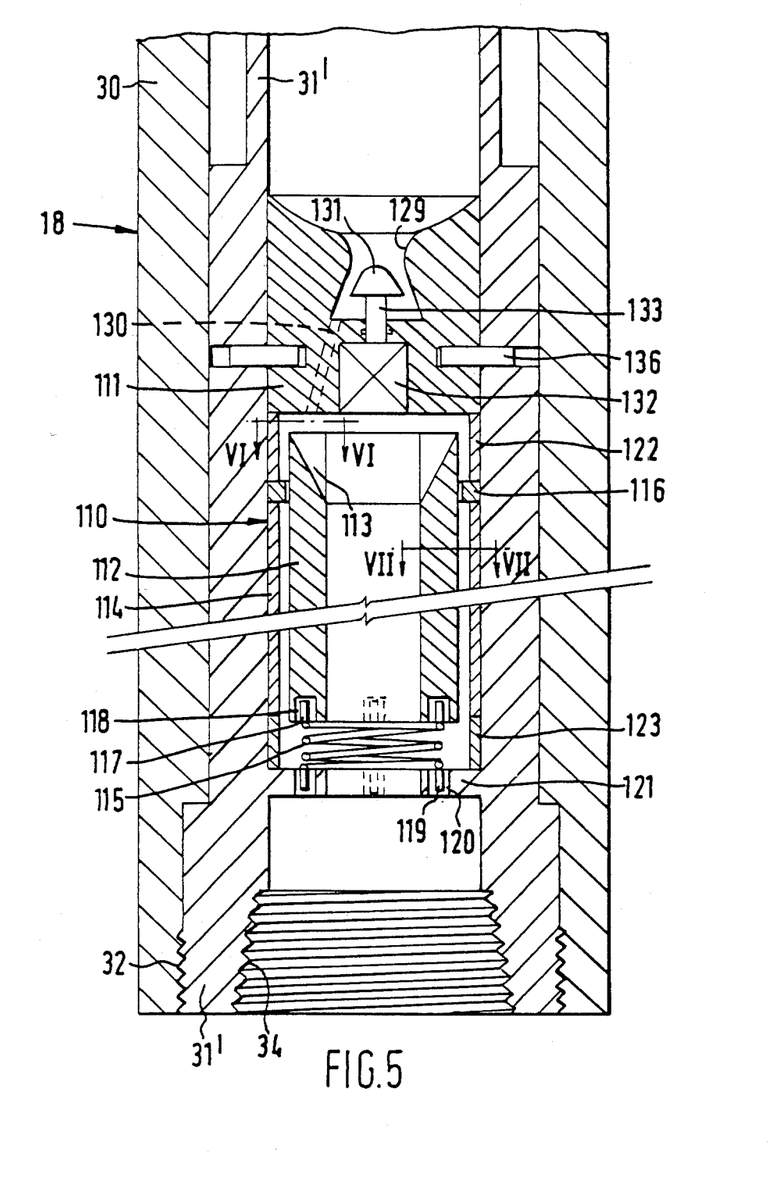
FIG. 5 shows schematically a longitudinal section of the lower end of a pipe section housing a telemetry system with a positive pressure pulse transmitter.

FIG. 5 shows schematically a longitudinal section of the lower part of a pipe section 18 housing a telemetry system with a positive pressure pulse transmitter. The upper part of pipe section 18 is shown in FIG. 2B and the operation of the components shown in FIG. 2B has been discussed hereinabove.

An oscillating electric generator 110 and a valve 111 are located in the conduit system which is formed by the interior of the pipe 31'. The pipe 31' is arranged concentric with the housing 30 and connected to the housing by means of a screw coupling 32.

Figure 6:
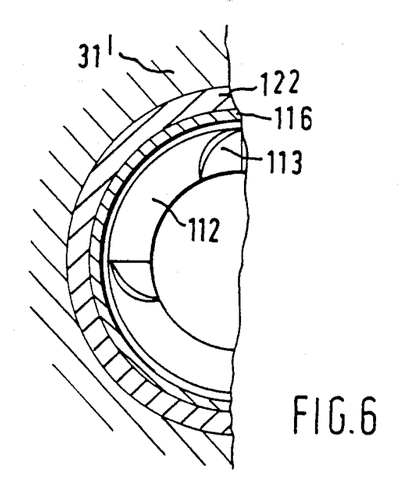
FIG. 6 shows a cross-section of FIG. 5 taken over the line VI—VI, reproduced on a scale larger than the scale of FIG. 5.

The oscillating electric generator 110 consists of an anchor 112 equipped with blades 113 and a stator 114. To illustrate the shape of the blades 113, reference is made to FIG. 6, which shows a part of the top view of the anchor 112. The anchor 112 is supported by a torsion spring 115 and is prevented from tilting by a ring 116. The upper end of the torsion spring 115 is connected to the anchor 112 by a plurality of pins 117 welded thereto, which pins 117 fit in holes 118 in the lower end of the anchor 112. A plurality of pins 119 is welded to the lower end of the torsion spring 115. The pins 119 fit in holes 120 in a flange 121 which is part of the pipe 31'. The stator 114 is confined between the valve 111 and the flange 121 by an upper- and a lower spacer ring 122 and 123, respectively. The stator 114 is electrically coupled to the rectifier (not shown) in the processor 41 (see FIG. 2B) by means of electric wires (not shown), running through a bore (not shown) in the wall of the pipe 31'.

The valve 111 consists of a valve seat 129, a conduit 130, a valve puppet 131 and an actuator 132 connected thereto by a stem 133. The actuator 132 consists of a solenoid that is electrically coupled to the processor 41 (see FIG. 2B) via electric wires (not shown) running through a bore (not shown) in the pipe 31'. The valve 111 is positioned in the pipe 31' by a plurality of pins 136. To allow displacement of the valve puppet 131 against the flow of drilling fluid through the valve seat 129, a hydraulic amplifier may be included in the valve to assist the solenoid. Such valve means with hydraulic amplifier are known per se from U.S. Pat. No.

3,693,428, therefore no detailed description of such a valve means is given here.

Figure 7:
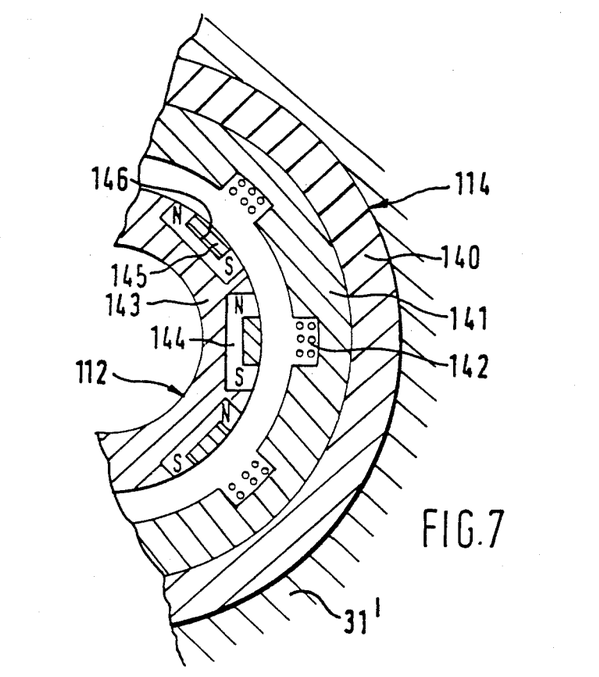
FIG. 7 shows a cross-section of FIG. 5 taken over the line VII—VII, and reproduced on a scale larger than the scale of FIG. 5.

FIG. 7 shows a part of the cross-section of the oscillating electric generator 110 of FIG. 5 on a scale larger than the scale of FIG. 5. The stator 114 consists of a cylindrical body 140, a magnitizable metal face 141 and coils 142 of insulated electric wires. The anchor 112 consists of a cylindrical body 143 with magnets 144 in axial direction thereof and elements 145 of non-magnetic material located in grooves 146 to separate each pair of the North and South pole faces of the magnets 144.

The operation of the telemetry system with the negative pressure pulse transmitter will now be described with reference to the FIGS. 1, 2B and 5.

Drilling proceeds with drill bit 12 attached to the lower end of drill string 11 in the borehole 10 (see FIG. 1). The valve 111 (see FIG. 5) is open and the valve puppet, 131 is in its lowermost position. When a survey has to be made the driller varies the pump pressure. The pattern with which the pump pressure is varied is detected by the pressure sensor 84 (see FIG. 2B) and recognized by the processor 41 (see FIG. 2B) as a signal to activate the system. The signal from the strain gauge 39 is coded by the signal adaptor 40 to a binary representation of the magnitude of the weight on bit. The processor 41 converts the binary signal into a sequence of commands that are conducted to the actuator 132 (see FIG. 5) of the valve 111. Valve 111 is then actuated in a sequence of openings and closings representing the magnitude of the weight on bit. The pressure variations induced by successively opening and closing the valve 111 are detected by the pressure sensor 28 (see FIG. 1) located on the stand pipe 24. The signal processor 29 at surface analyzes the signals from the pressure sensor 28, and displays the weight on bit in appropriate units and transmits the value to other locations. The processor 41 (see FIG. 2B) is programmed to deactivate the subsurface components when the survey has been performed, until a new survey has to be carried out.

The operation of the subsurface components of the system described above with reference to the combination of FIGS. 1, 2B and 5 requires electric energy, which is supplied by the electric accumulator 42 (see FIG. 2B). In order to recharge the accumulator during drilling, electric energy is generated with the oscillating electric generator 110 (see FIG. 5), the operation of which will now be described with reference to the FIGS. 5, 6 and 7. When valve 111 is in open position, drilling fluid flows along the valve puppet 131 and passes via the conduit 130 in the direction of the blades 113 on the anchor 112. The action of this flow through the conduit system on the blades 113 holds the anchor 112 in its initial position against the action of the torsion spring 115. To transmit data to surface, the valve 111 is closed and opened in a sequence representing the binary translation of the measured parameter. Closing the valve 111 restricts the flow through the conduit 130 and the torque on the blades 113 resulting from the action of the fluid flow decreases. As a result thereof the action of the torsion spring 115 forces the anchor 112 to rotate away from its initial position. Upon opening the valve 111 the action of the fluid flow out of the conduit 130 forces the anchor 112 to rotate back to its initial position.

The pole faces of the magnet 144 (see FIG. 7) move relative to the coils 142 together with the oscillating movement of the anchor 112. During each displacement an amount of electric energy is generated. The electric energy is conducted to the rectifier (not shown) in the processor 41 (see FIG. 2B), and from there it is conducted to the electric accumulator 42 where the electric energy is stored.

It will be appreciated that the oscillating generator actuated by the valve can generate electric energy independently of the sensor, in the same way as the linear generator discussed hereinabove.

It will be appreciated that the oscillating generator as described hereinabove with reference to FIG. 5 can be replaced by a linear electric generator of which the anchor is entrained in axial direction by the fluid flow through the valve 111.

The application of the present invention is not limited to the use thereof in drilling operations that are carried out by means of a rotating drill string. With equal good results, the means for generating electric energy included in a telemetry system may be used in a drilling operating wherein a down-hole motor, such as a hydraulic turbine is applied to drive the drill bit. Such down-hole motor is mounted in the lower end of the drill string, just above the drill bit 12 (see FIG. 1).

The present invention is not restricted to the use of the valves described with reference to FIGS. 2A and 5. If desired, the changes in the fluid flow through the pipe section required for generating the pressure pulses may be raised by the so-called fluidic oscillator. The fluidic oscillator is known per se from U.S. Pat. No. 3,405,770 and therefore it is not described here in detail.

The present invention is also not restricted to an electric generator provided with an anchor carrying the pole faces and a stator carrying the coils. Use may also be made of an electric generator wherein the coils and the pole faces are carried by the anchor and the stator, respectively.

Further, the present invention is not limited to magnetic-electric generators to generate electricity. Also electric generators using the principles of piezo-electricity or magneto-striction can be combined with pressure pulse telemetry systems. The first of these principles refers to generating electricity by deforming a suitable crystal. The moving part of the electric generator is then a mass coupled to the stationary crystal by means of a spring, which spring is designed such that the resonance frequency of the mass spring system optimizes the electric energy generated. The latter principle, that of the magneto-striction, refers to spontaneous magnetization by deforming a piece of a suitable material. The moving part of the generator then consists of a mass coupled to the piece of metal by a spring, and the immovable part consists of coils of electric wires. The design of the spring and the coils is such that an optimal amount of electric energy is generated.

I claim:

1. A machine, adapted to be carried in a section of drill string or similar downhole apparatus, for generating electric energy in response to fluid dynamics within the drill string, comprising:

a generator housing provided with connector means for mounting said housing within the drill string;

conduit means associated with said housing for providing fluid communication from the interior of the drill string through said housing;

valve means, associated with said conduit means, for controlling fluid flow through at least a part of said conduit means;

generator means, including a stator and an anchor, said stator being mounted within said housing, said anchor being contained within said housing so as to be movable in a reciprocating mode relative to said stator in response to changes in fluid flow through said conduit means caused by the operation of said valve means.

2. The machine of claim 1, wherein said conduit means includes a pipe section extending through said housing, said pipe section and said housing defining an annular space therebetween, said anchor being contained in the annular space; and wherein said conduit means further comprises fluid inlet means for providing fluid communication between the interior of said pipe section and the annular space, and fluid outlet means for providing fluid communication between the annular space and the exterior of said housing, said valve means being adapted to control fluid flow through said outlet means.

3. The machine of claim 2, further comprising a flexible ring for dividing the annular space into an upper section and a lower section, said upper section and said lower section each being provided with fluid inlet means for providing fluid communication with the interior of said pipe section, said anchor having a first and second end and being mounted within said housing at said first end via said first flexible ring and connected to said housing at said second end via a resilient spring means.

4. The machine of claim 1, wherein said conduit means comprises a pipe section extending through said housing, said generator means is mounted within said pipe section, and said valve means is adapted to control the flow of fluid through said pipe section.

5. The machine of claim 4, wherein said anchor is supported within said pipe section by spring means for returning said anchor to an at rest position in the absence of fluid flow through said pipe section and wherein said anchor is adapted to be linearly displaced with respect to said stator in response to changes in fluid flow through said pipe section.

6. The machine of claim 4, wherein said anchor includes a plurality of blades for inducing rotational movement of said anchor relative to said stator in response to fluid flow through said pipe section, and further comprising torsion spring means for mounting said anchor within said pipe section, said spring means being adapted to return said anchor to its at rest position in the absence of fluid flow through said pipe section.

* * * * *